US011814000B1

(12) United States Patent
Cook et al.

(10) Patent No.: US 11,814,000 B1
(45) Date of Patent: Nov. 14, 2023

(54) EXPANDABLE DEPLOYMENT FLAPS FOR VEHICULAR AIRBAG SYSTEMS

(71) Applicant: Nissan North America, Inc., Franklin, TN (US)

(72) Inventors: Austin Cook, Howell, MI (US); Brian Downey, Westland, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/899,043

(22) Filed: Aug. 30, 2022

(51) Int. Cl.
*B60R 21/2165* (2011.01)
*B60R 21/201* (2011.01)
*B60R 21/217* (2011.01)

(52) U.S. Cl.
CPC .......... *B60R 21/201* (2013.01); *B60R 21/217* (2013.01); *B60R 21/2165* (2013.01)

(58) Field of Classification Search
CPC .................................................... B60R 21/201
See application file for complete search history.

(56) References Cited

U.S. PATENT DOCUMENTS 6,131,944 A * 10/2000 Henkel .................. B60R 21/16 280/732
6,474,686 B1 * 11/2002 Higuchi ................ B60R 21/205 280/743.1
7,695,013 B2 * 4/2010 Kakstis .................. B60R 21/20 280/743.1
8,196,954 B2 * 6/2012 Choi .................. B60R 21/2176 280/730.2
8,272,664 B2 * 9/2012 Benny .................. B60R 21/201 280/743.1
8,596,679 B2 * 12/2013 Horikawa ............ B60R 21/217 280/743.2
9,010,804 B2 * 4/2015 Witt, Jr. ............. B60R 21/2171 280/743.2
10,829,074 B2 * 11/2020 Jacobson ............. B60R 21/231
11,472,365 B1 * 10/2022 Yaney .................. B60R 21/215
11,584,328 B2 * 2/2023 Swiniarski ........... B60R 21/205
2003/0218323 A1 * 11/2003 Berbalk ............. B60R 21/2171 280/743.1

(Continued)

FOREIGN PATENT DOCUMENTS

CN 112208478 A * 1/2021 .......... B60R 21/201
DE 102014016745 B3 * 10/2015 ........ B60R 21/2171

(Continued)

*Primary Examiner* — Nicole T Verley
(74) *Attorney, Agent, or Firm* — Young Basile Hanlon & MacFarlane, P.C.

(57) ABSTRACT

A deployment flap for a vehicular airbag system is disclosed. The deployment flap includes: a main body portion; wings that extend laterally from the main body portion; and at least one expandable portion. The main body portion includes a tear seam that is configured to separate during the inflation of an airbag such that the airbag extends through the deployment flap. The at least one expandable portion is reconfigurable from a collapsed configuration into an expanded configuration to thereby facilitate lengthening of the main body portion and the wings prior to separation of the tear seam during multi-stage inflation of the airbag, whereby the deployment flap directs the airbag and inhibits eccentric deployment.

20 Claims, 7 Drawing Sheets

(56) References Cited

U.S. PATENT DOCUMENTS

| | | | | |
|---|---|---|---|---|
| 2003/0234520 | A1* | 12/2003 | Hawthorn | B60R 21/16 280/728.1 |
| 2008/0217892 | A1* | 9/2008 | Maripudi | B60R 21/201 280/743.1 |
| 2009/0134609 | A1* | 5/2009 | Onohara | B60R 21/201 280/728.3 |
| 2009/0289441 | A1* | 11/2009 | Kakstis | B60R 21/201 280/728.1 |
| 2010/0066059 | A1* | 3/2010 | Klinkenberger | B60R 21/2334 280/728.1 |
| 2010/0102541 | A1* | 4/2010 | Shimizu | B60R 21/201 280/728.3 |
| 2010/0230935 | A1* | 9/2010 | Rose | B60R 21/205 280/728.2 |
| 2011/0049850 | A1* | 3/2011 | Horikawa | B60R 21/201 280/736 |
| 2021/0009073 | A1* | 1/2021 | Swiniarski | B60R 21/217 |

FOREIGN PATENT DOCUMENTS

| | | | | |
|---|---|---|---|---|
| EP | 945312 | A2 * | 9/1999 | B60R 21/16 |
| WO | WO-2009022527 | A1 * | 2/2009 | B60R 21/201 |
| WO | WO-2011052363 | A1 * | 5/2011 | B60R 21/201 |

* cited by examiner 12
16

428
400
418
10
6
428
430
430
20
18
14
200
100
300

12
16

428
400
418
10
428
430
430
7
8
20
18
14
200
100
300

EXPANDABLE DEPLOYMENT FLAPS FOR VEHICULAR AIRBAG SYSTEMS

TECHNICAL FIELD

The present disclosure relates to airbag systems in vehicles and, more specifically, to an expandable deployment flap that improves the trajectory of an airbag during inflation and deployment.

BACKGROUND

Certain vehicular airbag systems include flaps that are configured to guide an airbag during inflation in an attempt to control trajectory. Opportunities remain, however, to improve control, consistency, predictability, and repeatability in the deployment of airbags. The present disclosure addresses these opportunities by providing a deployment flap that is configured for multi-directional expansion during inflation of the airbag to better control trajectory by inhibiting (if not entirely preventing) eccentric deployment.

SUMMARY

In one aspect of the present disclosure, a vehicular airbag system is disclosed that includes: a case; an airbag that is housed within the case; a regulator that is in communication with the airbag and which is configured to inflate the airbag upon detection of a collision; and a deployment flap that is secured (e.g., fixedly or releasably connected) to the case and which extends about the airbag. The deployment flap defines a length and a width and includes: a main body portion; wings that extends laterally from the main body portion in generally parallel relation to the width of the deployment flap; expandable portions, which are defined by the main body portion and the wings; and restrictors that are in engagement with the expandable portions and which are configured to rupture during inflation of the airbag. The main body portion includes a tear seam that extends in generally parallel relation to the width of the deployment flap and which is configured to separate during inflation of the airbag such that the airbag extends through the deployment flap. Upon inflation, the airbag causes expansion of the expandable portions and lengthening of the main body portion and the wings prior to separation of the tear seam such that the deployment flap directs the airbag during inflation and inhibits eccentric deployment from the case.

In certain embodiments, the deployment flap may be integral in construction.

In certain embodiments, the main body portion and the wings may be formed form a single piece of fabric material.

In certain embodiments, the main body portion may include an aperture that is configured to receive the regulator such that that regulator extends through the main body portion.

In certain embodiments, the main body portion and the wings may each include at least one opening that is configured to receive a retainer on the case to thereby connect the main body portion and the wings to the case.

In certain embodiments, the tear seam may be generally linear in configuration.

In certain embodiments, the tear seam may be generally centered in relation to the case along a reference axis that extends in generally parallel relation to the length of the deployment flap.

In certain embodiments, the wings may be spaced from the tear seam along the length of the deployment flap.

In certain embodiments, the wings may include: a first wing that extends from the main body portion in a first direction; a second wing that is spaced from the first wing along the length of the deployment flap and which extends from the main body portion in the first direction; a third wing that extends from the main body portion in a second direction; and a fourth wing that is spaced from the third wing along the length of the deployment flap and which extends from the main body portion in the second direction.

In certain embodiments, the first wing and the third wing may be generally aligned along the length of the deployment flap.

In certain embodiments, the second wing and the fourth wing may be generally aligned along the length of the deployment flap.

In another aspect of the present disclosure, a deployment flap for a vehicular airbag system is disclosed. The deployment flap includes: a main body portion; wings that extend laterally from the main body portion; and at least one expandable portion. The main body portion includes a tear seam that is configured to separate during the inflation of an airbag such that the airbag extends through the deployment flap. The at least one expandable portion is reconfigurable from a collapsed configuration into an expanded configuration to thereby facilitate lengthening of the main body portion and the wings prior to separation of the tear seam during multi-stage inflation of the airbag, whereby the deployment flap directs the airbag and inhibits eccentric deployment.

In certain embodiments, the at least one expandable portion may include a folded configuration.

In certain embodiments, the at least one expandable portion may each include a rolled configuration.

In certain embodiments, the deployment flap may further include at least one restrictor that is in engagement with the at least one expandable portion.

In certain embodiments, the at least one restrictor may be frangible in construction such that the at least one restrictor ruptures during inflation of the airbag.

In certain embodiments, the at least one restrictor may be configured as a tack sew that is laced through the at least one expandable portion.

In another aspect of the present disclosure, a method of deploying an airbag in a vehicle is disclosed that includes: a first stage of deployment; a second stage of deployment; and a third stage of deployment. The first stage of deployment includes inflating the airbag to displace a deployment flap extending about the airbag, the second stage of deployment includes expanding the deployment flap, and the third stage of deployment includes separating the deployment flap along a tear seam such that the airbag extends through the deployment flap.

In certain embodiments, the second stage of deployment may include lengthening a main body portion of the deployment flap and lengthening wings that extend laterally from the main body portion.

In certain embodiments, lengthening the main body portion of the deployment flap and lengthening the wings may include expanding expandable portions of the deployment flap.

In certain embodiments, expanding the expandable portions may include unfolding the expandable portions.

In certain embodiments, expanding the expandable portions may include rupturing restrictors engaging the expandable portions.

BRIEF DESCRIPTION OF THE DRAWINGS

According to common practice, the various features of the drawings may not be to scale and may be arbitrarily expanded or reduced for clarity.

DETAILED DESCRIPTION

Figure 1:
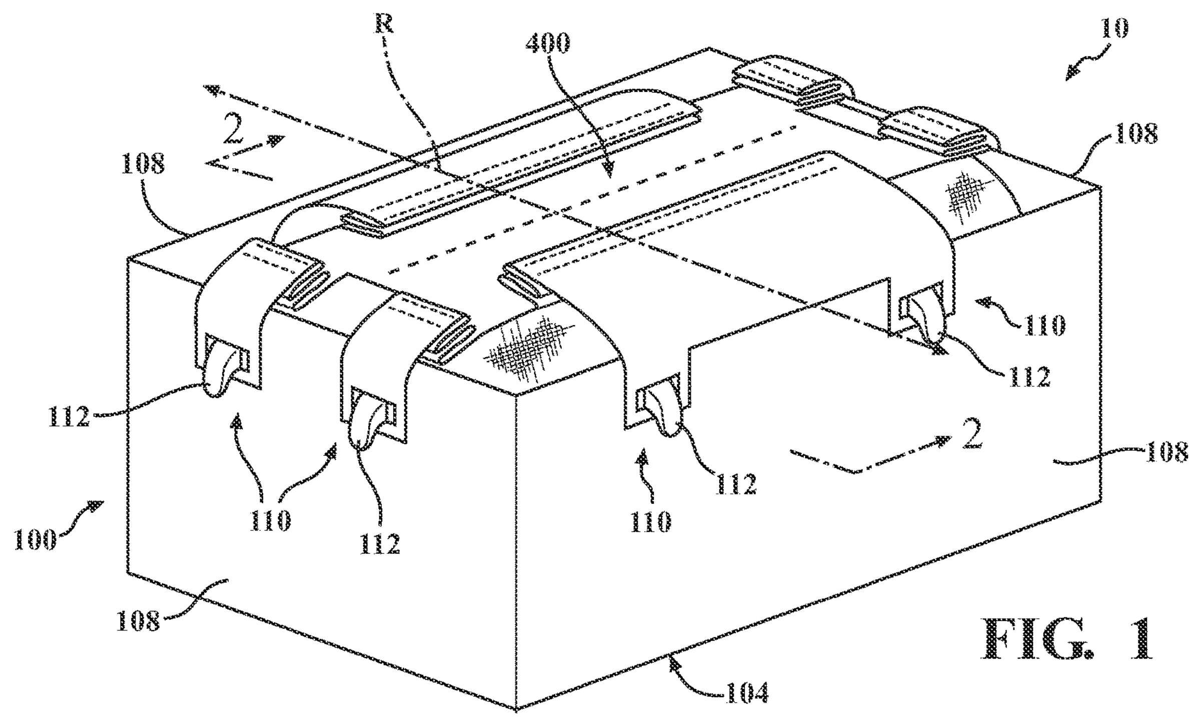
FIG. 1 is a top, perspective view of a vehicular airbag system including an expandable deployment flap according to the principles of the present disclosure.
Figure 2:
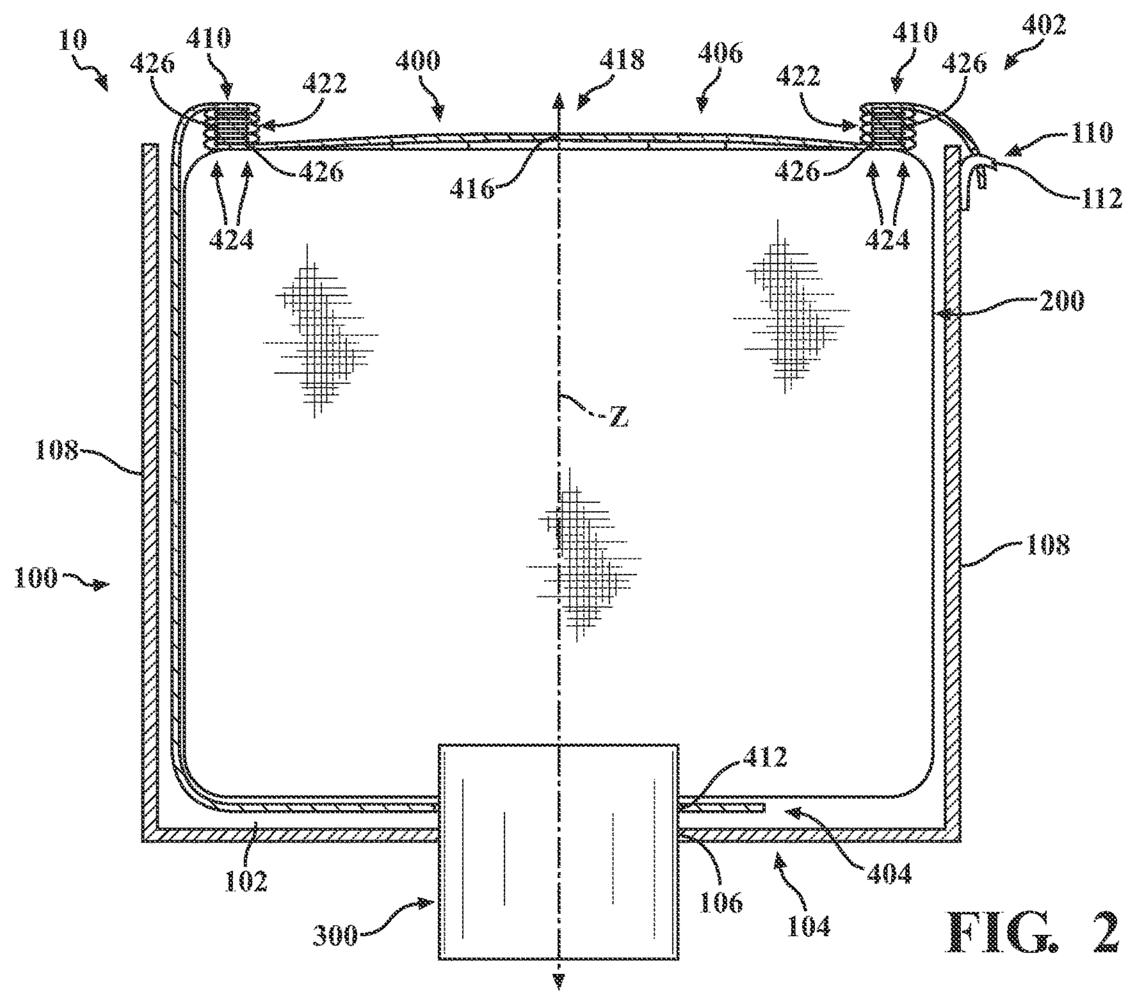
FIG. 2 is a vertical, cross-sectional view of the vehicular airbag system taken along line 2-2 in FIG. 1.

The present disclosure describes an expandable deployment flap for use in a vehicular airbag system to better control the trajectory of an airbag during inflation. The deployment flap is (non-resiliently, irreversibly) reconfigurable from a contracted (first, initial) configuration into an extended (second, subsequent) configuration and includes a tear seam and at least one expandable portion. The expandable portion(s) themselves are reconfigurable from a collapsed configuration into an expanded configuration, which facilitates multi-directional expansion of the deployment flap and multi-stage inflation of the airbag. This reconfigurability allows the deployment flap to constrain early trajectory of the airbag (e.g., prior to separation of the tear seam) during the resultant multi-stage inflation, which delays deployment and facilitates containment of the airbag for an increased period of time (compared to known systems including flaps that are devoid of the expandable portion(s) described herein). Extended containment of the airbag allows the inflationary forces in the airbag to normalize, which, in turn, allows the deployment flap to direct (guide) the airbag in a single, repeatable direction, thereby inhibiting (if not entirely preventing) eccentric (e.g., off-center) deployment and improving consistency in, and control over, the trajectory of the airbag (e.g., the direction of expansion during inflation).

In certain embodiments of the disclosure, the deployment flap further includes at least one frangible restrictor (e.g., one or more tack sews). The restrictor(s) engage the expandable portion(s) to maintain the collapsed configuration thereof prior to inflation of the airbag, which facilitates and improves packaging of the vehicular airbag system and further improves control, consistency, predictability, and repeatability during deployment of the airbag.

With reference to FIGS. 1-6, a vehicular airbag system 10 (e.g., an airbag system for a vehicle 12 (FIG. 10)) is illustrated that includes: a case (housing) 100; an airbag (cushion) 200; a regulator 300; and a deployment flap 400. Although generally illustrated and described in the context of a passenger vehicle, it should be appreciated that the principles of the present disclosure are equally applicable to a variety of vehicles (e.g., trucks, SUVs, vans, buses, boats, airplanes, trains, etc.).

The case 100 defines an internal chamber 102 (FIG. 2) that is configured to receive (accommodate) the airbag 200 such that the airbag 200 is housed (stored) within the case 100 prior to deployment (e.g., inflation and exiting of the airbag 200 from the case 100). The case 100 includes a base wall 104 that defines an opening 106; a plurality of sidewalls 108 that extend (vertically upward) from the base wall 104; and a plurality of (external) retainers 110 (e.g., hooks 112) that are configured for engagement (contact) with the deployment flap 400 to thereby secure (e.g., fixedly or releasably connect) the deployment flap 400 to the case 100. It is envisioned that that case 100 may include any suitable material or combination of materials, whether metallic or non-metallic. For example, the present disclosure envisions embodiments in which the case 100 may include (e.g., may be formed partially or entirely from) one or more metallic materials (e.g., aluminum, stainless steel, etc.), one or more plastic materials, one or more polymeric materials, one or more composite materials (e.g., carbon fiber), etc., either individually or in combination.

The regulator 300 is in (fluid) communication with the airbag 200 and is configured to facilitate inflation of the airbag 200 upon the detection of a collision (or other such impact) with the vehicle 12. In the embodiment illustrated, the regulator 300 is secured (fixed, connected to) to the case 100 (e.g., the base wall 104) and extends into the internal chamber 102 via the opening 106. It should be appreciated, however, that the particular location and/or configuration of the regulator 300 may be altered in various embodiments without departing from the scope of the present disclosure (e.g., depending upon the configuration of the case 100, spatial constraints, the style of the vehicle 12, the location of the vehicular airbag system 10, etc.). For example, embodiments in which the regulator 300 may be entirely housed (stored, accommodated) within the case 100 are also envisioned herein, as are embodiments in which the regulator 300 may be located externally of the case 100 in its entirety.

The deployment flap 400 extends about and (partially or entirely) covers the airbag 200. The deployment flap 400 is configured to (temporarily) resist expansion and constrain inflation of the airbag 2000 to delay deployment from the case 100, as described in detail below, and defines a length L (FIG. 3A) that extends along a longitudinal (first) axis Y and a width W that extends along a transverse (second) axis X, which is arranged in (generally) orthogonal relation to the longitudinal axis Y. The deployment flap 400 is (non-resiliently, irreversibly) reconfigurable from a contracted (first, initial) configuration (FIG. 3A) into an extended (second, subsequent) configuration (FIG. 6) and includes: opposite (first and second) end portions 402, 404; a main body portion 406; a plurality of wings 408; and at least one (one or more, a plurality of) expandable portions 410.

In the embodiment illustrated, the deployment flap 400 is integral (e.g., unitary, monolithic) in construction. More specifically, the main body portion 406 and the wings 408 include (e.g., are formed from) a single piece of fabric material. It is envisioned, however, that the deployment flap 400 may include any material or combination of materials suitable for the intended purposes described herein. For example, embodiments are also envisioned in which the deployment flap 400 may include (e.g., may be formed partially or entirely from) one or more plastic materials, one or more polymeric materials, one or more composite materials, etc.

The main body portion 406 includes: an aperture 412 (FIGS. 2, 3A); one or more (at least one) openings 414 that are configured to receive the retainers 110 (FIGS. 1, 2) such that the main body portion 406 is releasably engageable with, and is repeatably connectable to and disconnectable from, the case 100; and a plurality of perforations 416 (or other such openings, weakened portions, etc.) that collectively define a tear seam 418, which extends in (generally) parallel relation to the width W of the deployment flap 400 and in transverse (e.g., (generally) orthogonal) relation to the length L of the deployment flap 400. The tear seam 418 is frangible and is configured to separate during inflation of the airbag 200, which facilitates (e.g., permits, allows) deployment of the airbag 200 from the case 100 such that the airbag 200 extends through the deployment flap 400 via the tear seam 418 during inflation.

The aperture 412 extends through the (second) end portion 404 of the deployment flap 400 and is configured to receive the regulator 300 such that that regulator 300 extends through the main body portion 406, thereby further securing the deployment flap 400 to the case 100. For example, it is envisioned that the aperture 412 may be configured to receive the regulator 300 in an interference (friction) fit so as to mechanically connect the deployment flap 400 to the case 100 via the regulator 300, or in any other suitable manner.

The opening(s) 414 are provided in (defined by) one or more tabs 420 that extend outwardly from, and are formed integrally (e.g., unitarily, monolithically) with, the main body portion 406 at the (first) end portion 402 of the deployment flap 400. Embodiments are also envisioned, however, in which the tab(s) 420 may be eliminated from the deployment flap 400. In such embodiments, it is envisioned that the opening(s) 414 may be provided in (defined by) the main body portion 406 itself, which would allow for an overall reduction in the length L of the deployment flap 400.

Figure 3A:
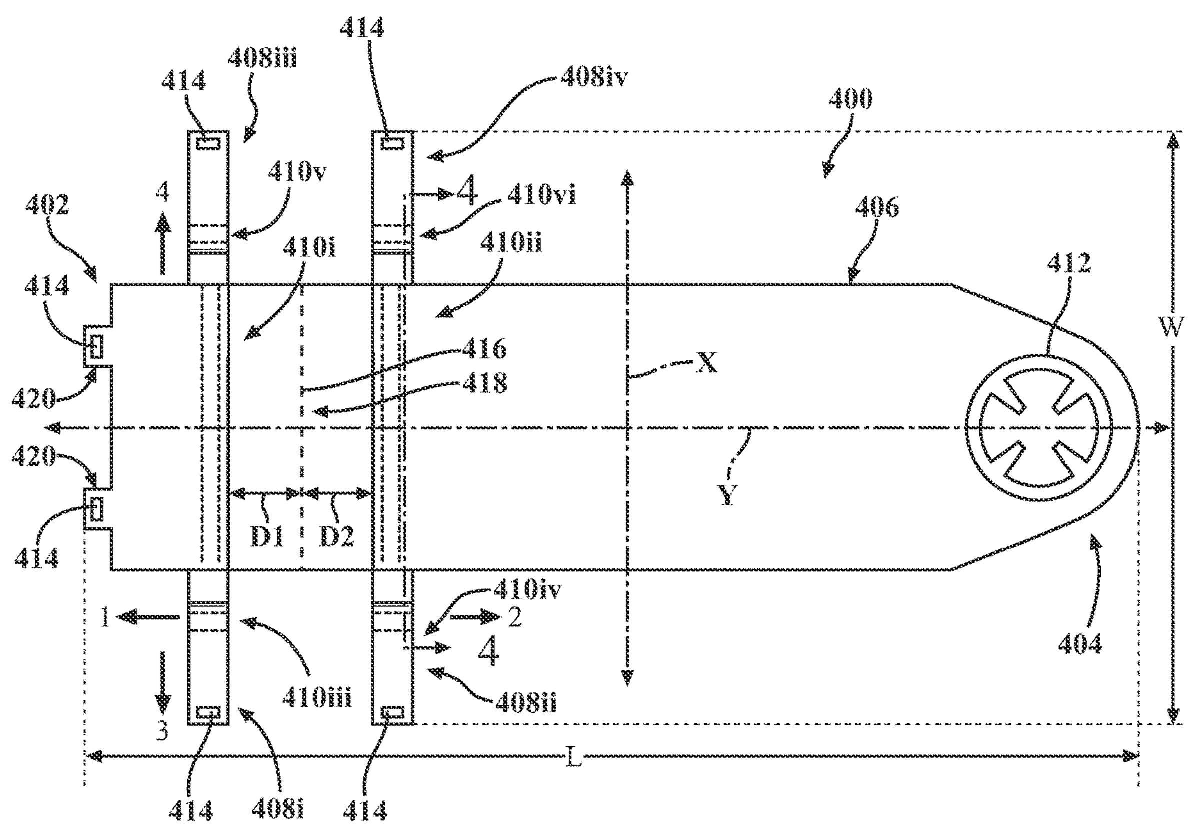
FIG. 3A is a top, plan view of the deployment flap shown in a contracted configuration.
Figure 3B:
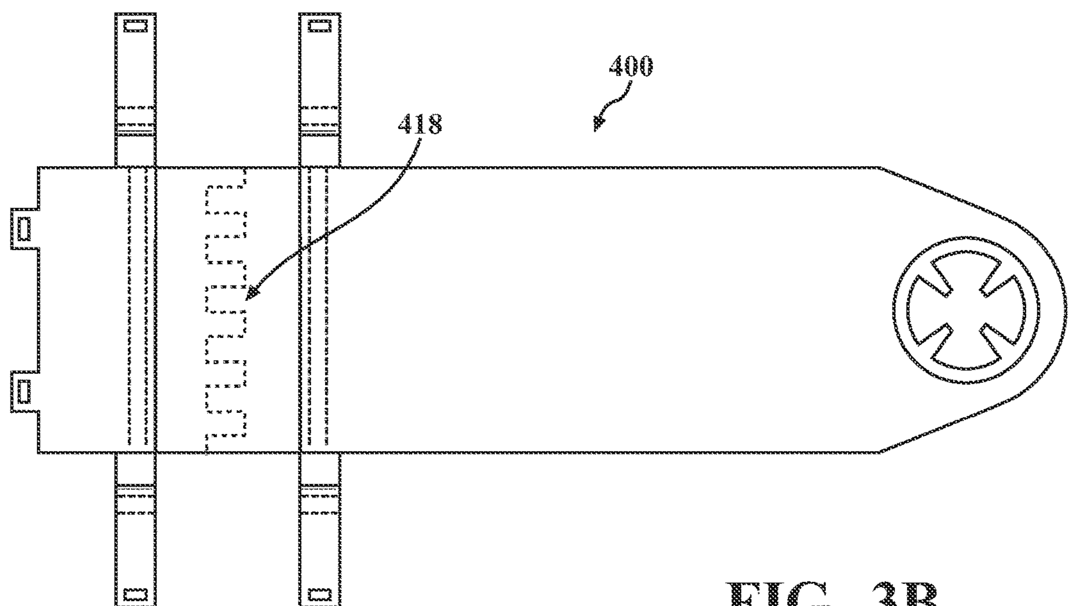
FIG. 3B is a top, plan view of the deployment flap according to an alternate embodiment of the disclosure.
Figure 4:
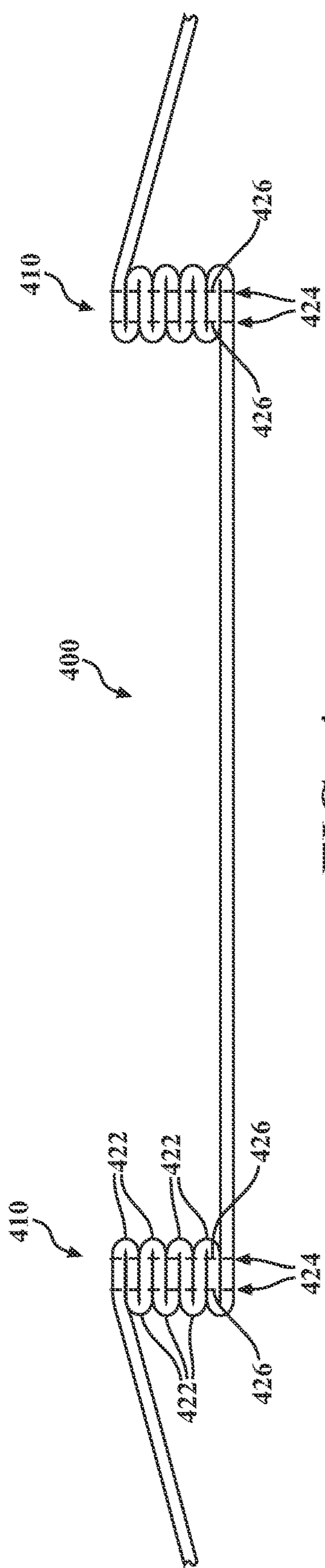
FIG. 4 is a partial, vertical, cross-sectional view of the deployment flap taken along line 4-4 in FIG. 3A.

In the embodiment illustrated, the tear seam 418 is (generally) linear in configuration and is positioned on the main body portion 406 such that, upon connection of the deployment flap 400 to the case 100, the tear seam 418 is (generally) centered in relation to the case 100 along a reference axis R (FIG. 1) that extends in (generally) parallel relation to the length L (FIG. 3A) of the deployment flap 400. Embodiments in which the tear seam 418 may be non-linear in configuration (e.g., arcuate, segmented, undulating, etc.) are also envisioned herein, as seen in FIG. 3B, as are embodiments in which the tear seam 418 may positioned such that the tear seam 418 is located eccentrically (e.g., off-center) in relation to the case 100 along the reference axis R (e.g., by positioning the tear seam 418 closer to one of the end portions 402, 404 of the deployment flap 400). It is envisioned that altering the configuration and/or the position of the tear seam 418 may allow for controlled variation in the trajectory of the airbag 200 during inflation (e.g., the direction of expansion), thereby allowing deployment of the airbag 200 to be customized (e.g., depending upon the configuration of the case 100, spatial constraints, the style of the vehicle 12, the location of the vehicular airbag system 10, etc.).

The wings 408 extend laterally from the main body portion 406 (e.g., in (generally) parallel relation to the width W of the deployment flap 400) and are spaced from the tear seam 418 along the length L of the deployment flap 400. In the embodiment illustrated, the deployment flap 400 includes: a first wing 408*i* that extends from the main body portion 406 in a first (lateral) direction, which is identified by the arrow 1; a second wing 408*ii* that is spaced from the first wing 408*i* along the length L of the deployment flap 400 and which extends from the main body portion 406 in the first direction 1; a third wing 408*iii* that extends from the main body portion 406 in a second (lateral) direction, which is identified by the arrow 2; and a fourth wing 408*iv* that is spaced from the third wing 408*iii* along the length L of the deployment flap 400 and which extends from the main body portion 406 in the second direction 2. As such, the wings 408*i*, 408*iii* are positioned on a first side of the tear seam 418 (e.g., closer to the (first) end portion 402 of the deployment flap 400), and the wings 408*ii*, 408*iv* are located on an opposite, second side of the tear seam 418 (e.g., closer to the (second) end portion 404 of the deployment flap 400).

In the embodiment illustrated, the deployment flap 400 is configured such that the wings 408*i*, 408*iii* and the wings 408*ii*, 408*iv* are spaced (generally) equidistant from the tear seam 418 along the length L of the deployment flap 400. More specifically, as seen in FIG. 3A, the wings 408*i*, 408*iii* and the wings 408*ii*, 408*iv* are spaced from the tear seam 418 by (substantially) equivalent axial distances D1, D2, respectively. Embodiments are also envisioned, however, in which the axial distances D1, D2 may be unequal (e.g., such that the axial distance D1 exceeds the axial distance D2, or vice versa).

With continued reference to FIG. 3A, the deployment flap 400 is configured such that the wings 408*i*, 408*iii* and the wings 408*ii*, 408*iv* are (generally) aligned along the length L of the deployment flap 400. Embodiments are also envisioned, however, in which the wings 408*i*, 408*iii* and the wings 408*ii*, 408*iv* may be misaligned (offset) along the length L of the deployment flap 400 (e.g., to alter separation of the tear seam 418 and thereby vary the trajectory of the airbag 200 during deployment from the case 100).

While the deployment flap 400 is illustrated as including four wings 408, it should be appreciated that the particular number of wings 408 may be altered in various embodiments without departing from the scope of the present disclosure. As such, embodiments of the deployment flap 400 including both greater and fewer numbers of wings 408 are also envisioned herein and would not be beyond the scope of the present disclosure.

Each wing 408 includes one or more (at least one) of the aforementioned openings 414 such that the wings 408 are releasably engageable with, and are repeatably connectable to and disconnectable from, the case 100. In the embodiment illustrated, the opening(s) 414 are provided in (defined by) the wings 408 themselves. Embodiments are also envisioned, however, in which the wings 408 include one or more (at least one) of the aforementioned tabs 420 (FIG. 1), which may be formed integrally (e.g., unitarily, monolithically) therewith, as discussed above in connection with the openings 414 in the main body portion 406.

With continued reference to FIGS. 1-6, the expandable portion(s) 410 will be discussed. The expandable portion(s) 410 are reconfigurable from a collapsed (first, initial) configuration (FIG. 3A), which corresponds to the contracted configuration of the deployment flap 400, into an expanded (second, subsequent) configuration (FIG. 6), which corresponds to the extended configuration of the deployment flap

400. The reconfigurability of the deployment flap 400 facilitated by the expandable portion(s) 410 allows for expansion (elongation, lengthening) of the deployment flap 400 in one or more directions and results in multi-stage inflation of the airbag 200, as elaborated on in further detail below. Subjecting the airbag 200 to multi-stage inflation allows the deployment flap 400 to contain early trajectory of the airbag 200 (e.g., inflation of the airbag 200 prior to separation of the tear seam 418) and delays deployment for an increased period of time (e.g., relative to known flaps that are devoid of the expandable portion(s) 410). Delaying deployment improves behavior of the airbag 200 during inflation as the airbag 200 exits the case 100 and increases consistency in, and control over, the trajectory of the airbag 200. More specifically, the delayed deployment facilitated by the configuration of the deployment flap 400 allows the deployment flap 400 to direct (guide) the airbag 200 during inflation and encourages (supports) expansion of the airbag 200 in a single, repeatable direction, thereby inhibiting (if not entirely preventing) eccentric (e.g., off-center) deployment from the case 100 and improving control, consistency, predictability, and repeatability in operation of the vehicular airbag system 10.

In the embodiment illustrated, the expandable portion(s) 410 include a folded configuration that is defined by a plurality of (folded) pleats 422 (FIGS. 2, 4), which are arranged in a stacked orientation in (generally) parallel relation to an axis Z (FIG. 2) that extends in (generally) orthogonal relation to the axes X, Y (FIG. 3A). It should be appreciated that the particular number of pleats 422 defining each of the expandable portion(s) 410 may be altered in various embodiments to increase or decrease the delay in deployment of the airbag 200. As such, embodiments of the deployment flap 400 including both greater and fewer numbers of pleats 422 than that which is illustrated are envisioned herein, as are embodiments in which the dimensions of the pleats 422 may be increased or decreased.

Figure 5:
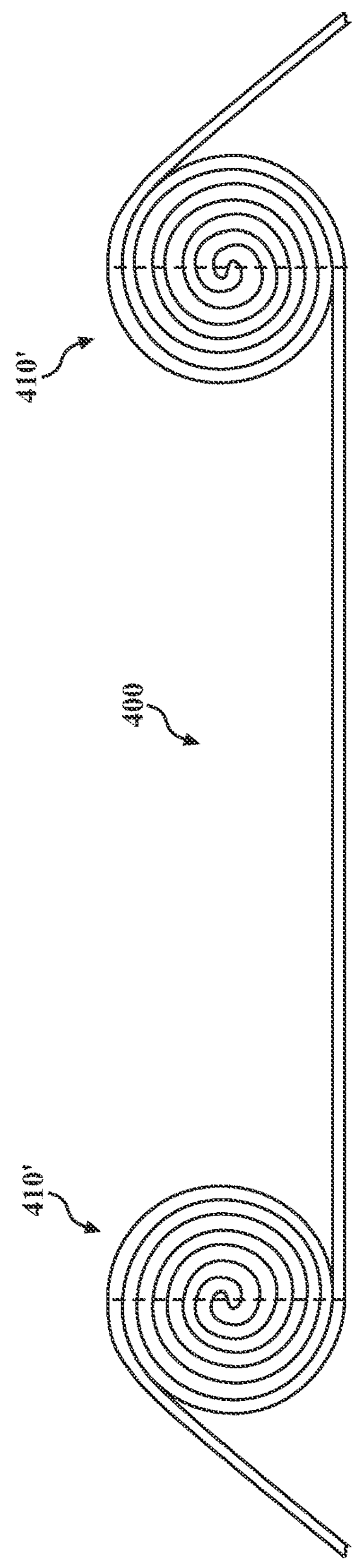
FIG. 5 is a partial, vertical, cross-sectional view of the deployment flap taken along line 4-4 in FIG. 3A according to an alternate embodiment of the disclosure.
Figure 6:
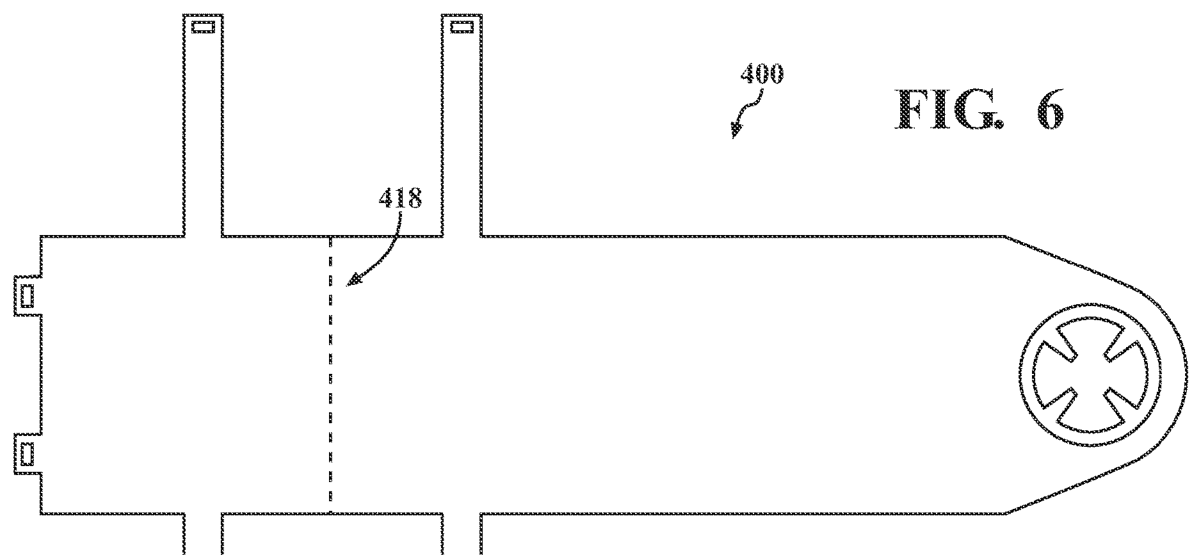
FIG. 6 is a top, plan view of the deployment flap shown an extended configuration.

FIG. 5 illustrated an alternate configuration for the expandable portion(s) 410 which are devoid of the pleats 422. Rather, in the embodiment illustrated in FIG. 5, the deployment flap 400 includes expandable portion(s) 410' having a rolled configuration.

With reference to FIG. 3A in particular, the expandable portions 410 are defined by (included, provided on) both the main body portion 406 and the wings 408, which facilitates the aforementioned multi-directional expansion of the deployment flap 400 (prior to separation of the tear seam 418) as both the main body portion 406 and the wings 408 elongate (lengthen). More specifically, the main body portion 406 includes (first and second) expandable portions 410*i*, 410*ii*, and the wings 408*i*-408*iv* respectively include (third, fourth, fifth, and sixth) expandable portions 410*iii*-410*vi*. The expandable portions 410*i*, 410*ii* allow the main body portion 406 to lengthen (expand) along the longitudinal axis Y (e.g., in the directions identified by the arrows 1 and 2) so as to increase the length L of the deployment flap 400 and are located on opposite sides of the tear seam 418 (e.g., such that the expandable portion 410*ii* is spaced a greater axial distance from the (first) end portion 402 of the deployment flap 400 than the expandable portion 410*i*). Similarly, the expandable portions 410*iii*-410*vi* allow the wings 408 to lengthen (expand) along the axis X (e.g., in the directions identified by the arrows 3 and 4) so as to increase the width W of the deployment flap 400.

While the deployment flap 400 includes six expandable portions 410 in the embodiment illustrated, embodiments including both greater and fewer numbers of expandable portions 410 are also envisioned herein and would not be beyond the scope of the present disclosure. For example, the present disclosure envisions embodiments in which the expandable portions 410 may be omitted from the main body portion 406 or the wings 408, as well as embodiments in which the wings 408 may each include a plurality of expandable portions 410, and embodiments in which the deployment flap 400 may include a single expandable portion 410 on the main body portion 406.

In certain embodiments of the disclosure, such as that illustrated in FIGS. 1-6, the deployment flap 400 further includes at least one (one or more, a plurality of) restrictor (retention member) 424 (FIGS. 2, 4), which engage the expandable portion(s) 410 to maintain the collapsed configuration thereof (FIG. 3A) prior to inflation of the airbag 200, thereby facilitating and improving packaging of the vehicular airbag system 10 and further improving control, consistency, predictability, and repeatability in operation of the vehicular airbag system 10. Embodiments of the deployment flap 400 that are devoid of the restrictor(s) 424, however, are also envisioned herein and would not be beyond the scope of the present disclosure. For example, depending upon the configuration of the case 100, spatial constraints, the style of the vehicle 12, the location of the vehicular airbag system 10, the particular configuration of the deployment flap 400, the material(s) used in construction of the deployment flap 400, etc., it is envisioned that the restrictor(s) 424 may be eliminated to simplify assembly and/or packaging of the vehicular airbag system 10.

The restrictor(s) 424 are frangible in construction and are configured to rupture during inflation of the airbag 200, which allows for expansion of the expandable portion(s) 410 during reconfiguration from the collapsed configuration into the expanded configuration with little (if any) interference. In the embodiment illustrated, the deployment flap 400 includes a plurality of restrictors 424 that are configured as tack sews 426, which are laced through the expandable portions 410 and include (e.g., are formed partially or entirely from) a fabric material. It should be appreciated, however, that the restrictors 424 may include any material or combination of materials that allows for rupture of the restrictors 424 during inflation of the airbag 200 in the manner described herein. For example, embodiments are also envisioned in which the restrictors 424 may include (e.g., may be formed partially or entirely from) one or more plastic materials, one or more polymeric materials, one or more composite materials, etc.

It should be appreciated that the particular number of restrictors 424 included on the deployment flap 400 may be altered in various embodiments without departing from the scope of the present disclosure. For example, it is envisioned that the number of restrictors 424 associated with the expandable portions 410 may be varied depending upon the configuration of the deployment flap 400 (e.g., the length L and/or the width W thereof), the configuration of the airbag 200, the configuration of the case 100, spatial constraints, the style of the vehicle 12, the location of the vehicular airbag system 10 in the vehicle 12, etc. More specifically, embodiments are envisioned in which a single restrictor 424 may be associated with each expandable portion 410 (e.g., such that the expandable portion(s) 410 and the restrictor(s) 424 correspond in number), as are embodiments in which a plurality of restrictors 424 may be associated with each of the expandable portions 410, and embodiments in which the number of restrictors 424 associated the expandable portions 410 may vary across the deployment flap 400. For example, in one particular embodiment, it is envisioned that a plurality of restrictors 424 may be associated with each of the expandable portions 410*i*, 410*ii* defined by (included on) the main body portion 406 and that a single restrictor 424 may be associated with the expandable portions 410*iii*-410*vi* defined by (included on) the wings 408*i*-408*iv*, respectively. As such, embodiments of the deployment flap 400 including both greater and fewer numbers of restrictors 424 are envisioned herein and would not be beyond the scope of the present disclosure.

With reference now to FIGS. 7-10 as well, use and operation of the vehicular airbag system 10 will be discussed. Throughout the following discussion, the vehicular airbag system 10 is illustrated and described as being located in a front (forward) instrument panel 14 (FIG. 10) of the vehicle 12 such that the airbag 200 is deployed (generally) upward (vertically) towards a front (forward) windshield 16 of the vehicle 12. It should be appreciated, however, that the vehicular airbag system 10 and the deployment flap 400, in particular, may be configured for use in a wide variety of locations in the vehicle 12. For example, it is envisioned that the vehicular airbag system 10 and the deployment flap 400 may be configured for use with side airbags in the vehicle 12.

Figure 7:
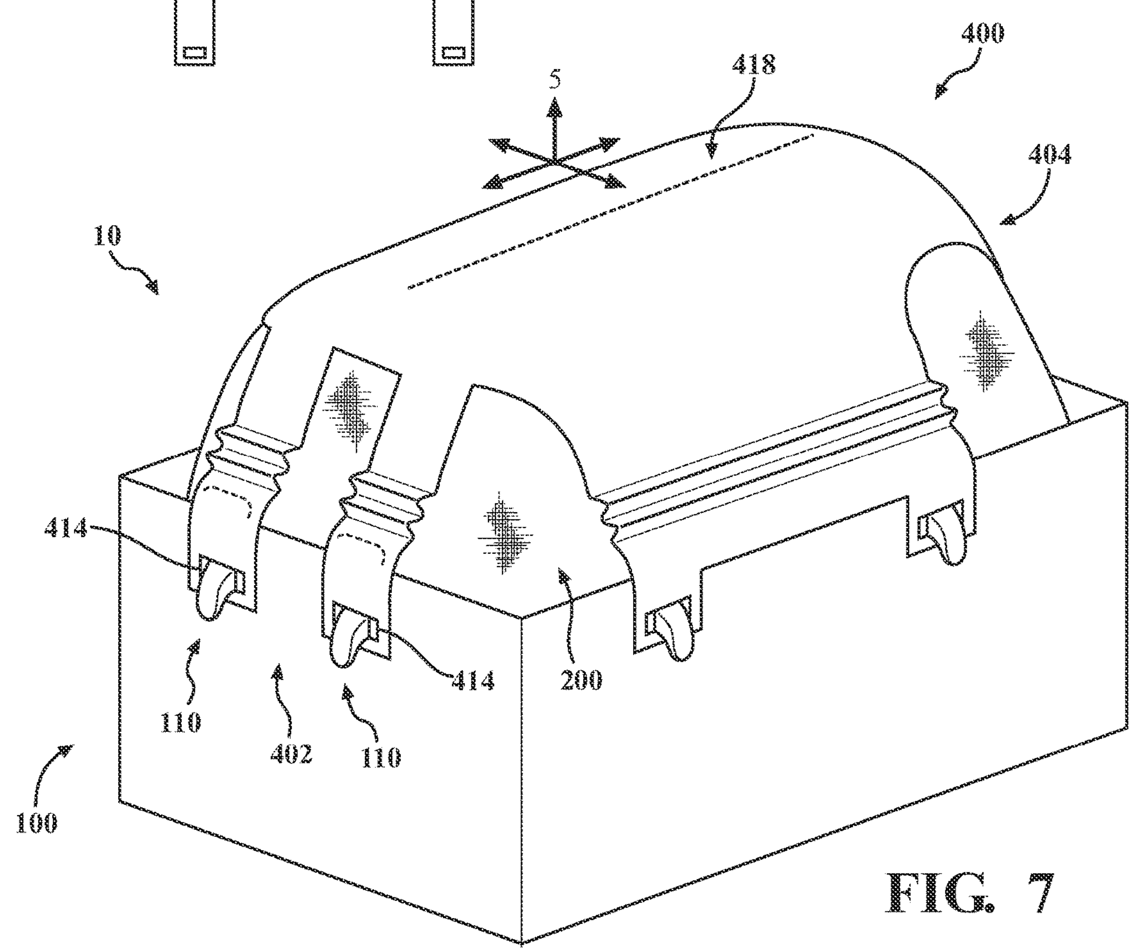
FIG. 7 is a top, perspective view of the vehicular airbag system during a first stage of deployment.
Figure 8:
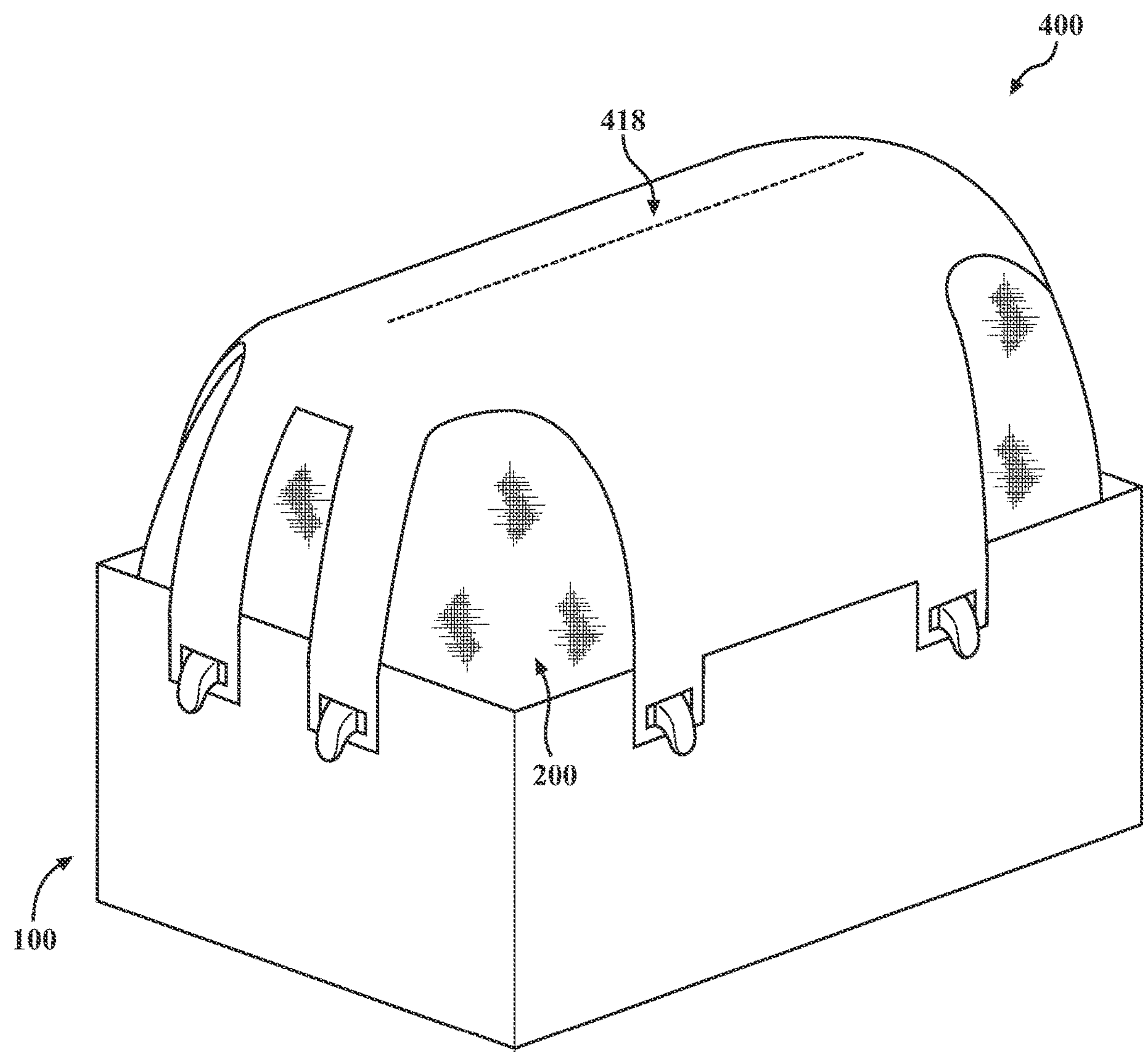
FIG. 8 is a top, perspective view of the vehicular airbag system during a second stage of deployment.

Initially, with the deployment flap 400 in the contracted configuration (FIG. 3A), the regulator 300 (FIG. 2) is actuated (e.g., upon detecting a collision with the vehicle 12), which causes multi-stage inflation and deployment of the airbag 200. More specifically, due to the configuration of the deployment flap 400, the airbag 200 experiences: initial inflation during a first stage of deployment, which is illustrated in FIG. 7; continued inflation during a second stage of deployment, which is illustrated in FIG. 8; and end-stage (final) inflation during a third stage of deployment, which is illustrated in FIGS. 9 and 10.

In the first stage of deployment (FIG. 7), inflation of the airbag 200 causes (outward) displacement of the deployment flap 400 in one or more of the directions identified by arrows 5. Displacement of the deployment flap 400 causes increased tension as force is applied to the (first) end portion 402 of the deployment flap 400 via the interface between the opening(s) 414 and the retainers 110 and to the (second) end portion 404 of the deployment flap 400 via the interface between the aperture 412 (FIGS. 2, 3A) and the regulator 300.

Thereafter, inflation of the airbag 200 continues during the second stage of deployment (FIG. 8), which occurs prior to separation of the deployment flap 400 along the tear seam 418. During the second state of deployment, the deployment flap 400 undergoes the aforementioned multi-directional expansion during reconfiguration from the contacted configuration (FIG. 3A) into the extended configuration (FIGS. 6, 8) as the expandable portions 410 expand and unfold (or unroll) during reconfiguration from the collapsed configuration into the expanded configuration. More specifically, as the pleats 422 (FIGS. 2, 4) unfold, the main body portion 406 lengthens in the directions identified by arrows 1 and 2 (FIG. 3A) and the wings 408 lengthen in the directions identified by the arrows 3 and 4, which causes the restrictors 424 (FIGS. 2, 4) to rupture. The expandability facilitated by the expandable portions 410 allows the deployment flap 400 to (temporarily) resist expansion and constrain inflation of the airbag 2000 to delay deployment from the case 100 and thereby contain the airbag 200 for a longer period of time than would otherwise be permitted (e.g., in the absence of the expandable portions 410) so as to permit the inflationary forces to normalize. Containing the airbag 200 during force normalization allows the deployment flap 400 to direct (guide) the airbag 200 in a single direction, which inhibits (if not entirely prevents) eccentric inflation, thereby improving not only control of the airbag 200 (e.g., the trajectory of the airbag 200 as the airbag 200 exits the case 100 and the front instrument panel 14), but consistency, predictability, and repeatability in operation of the vehicular airbag system 10.

Figure 9:
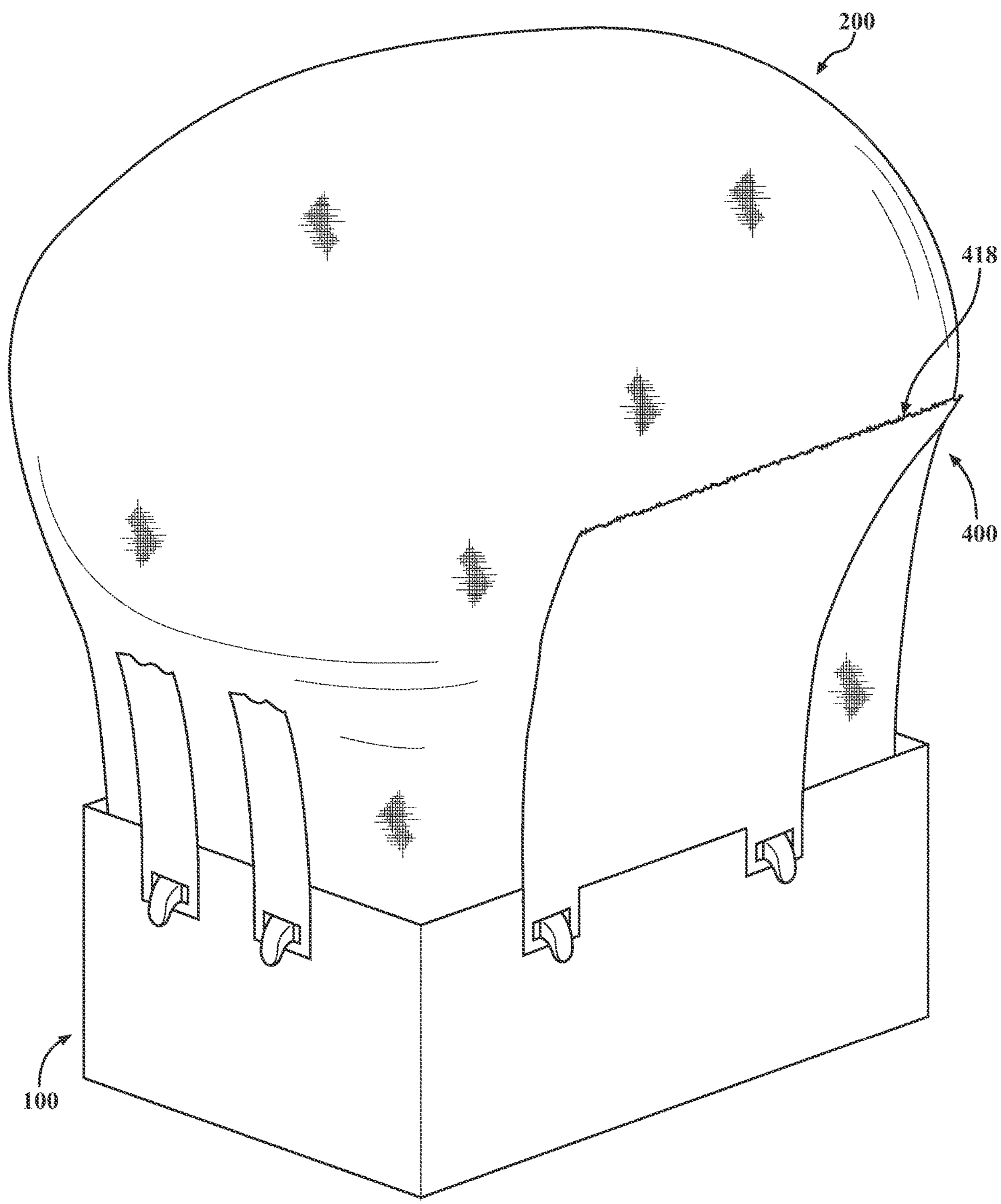
FIG. 9 is a top, perspective view of the vehicular airbag system during a third stage of deployment.
Figure 10:
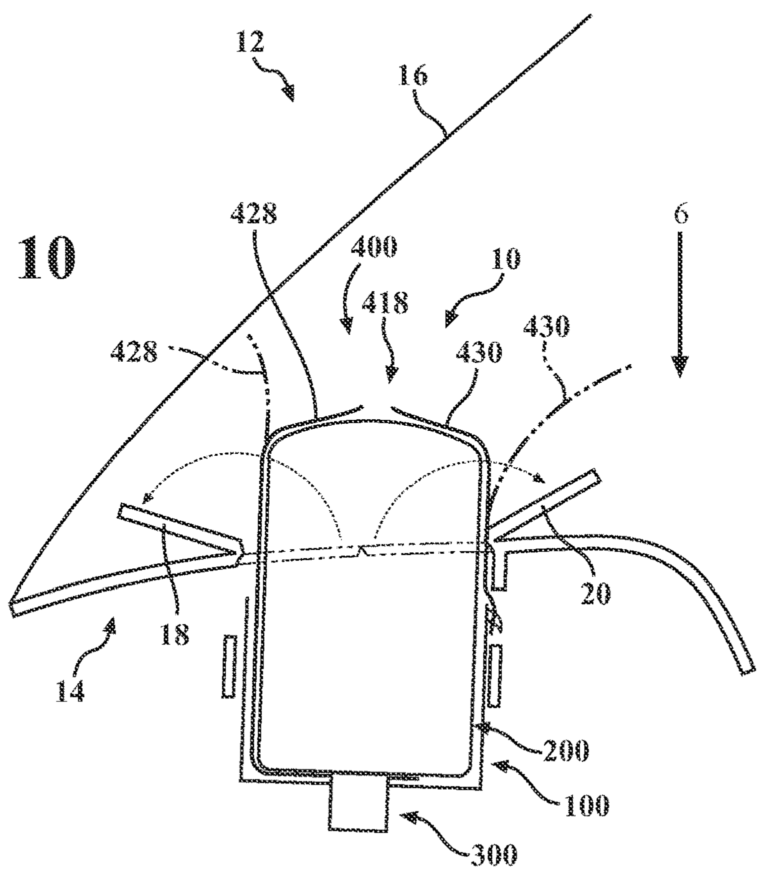
FIG. 10 is a vertical, cross-sectional view of the deployment system shown during use according to one embodiment of the present disclosure.

Following expansion of the deployment flap 400 (e.g., reconfiguration of the expandable portions 410 into the expanded configuration), end-stage inflation of the airbag 200 occurs during the third stage of deployment (FIGS. 9, 10). During the third stage of deployment, the deployment flap 400 separates along the tear seam 418, which eliminates any continued resistance to inflation and allows the airbag 200 to extend from the case 100 through the deployment flap 400. As expansion continues, the airbag 200 engages (contacts) doors 18, 20 (FIG. 10) in the front instrument panel 14, thereby forcing the doors 18, 20 open as the airbag 200 exits the front instrument panel 14 towards the front windshield 16.

As seen in FIG. 10, separation of the deployment flap along the tear seam 418 creates (first, front and second, rear) flap portions 428, 430, which extend in opposite directions. More specifically, the flap portion 428 extends towards the front windshield 16 and the flap portion 430 extends towards an occupant of the vehicle 12.

In one embodiment of the disclosure, which is illustrated in FIG. 10, the deployment flap 400 is configured such that the flap portion 430 guides the airbag 200 so as to inhibit (or potentially prevent) the application of downward force in the direction identified by the arrow 6.

Figure 11:
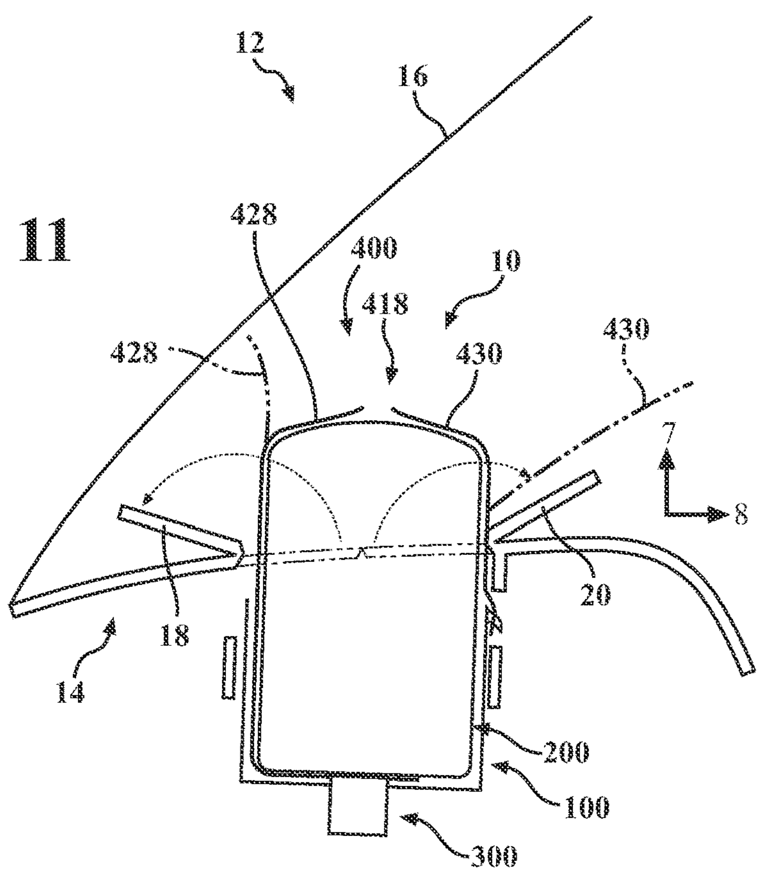
FIG. 11 is a vertical, cross-sectional view of the deployment system shown during use according to an alternate embodiment of the present disclosure.

In another embodiment of the disclosure, however, which is illustrated in FIG. 11, the deployment flap 400 is configured such that the flap portion 430 guides the airbag 200 so as to inhibit (or potentially prevent) the application of force in the directions identified by the arrows 7 and 8.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (e.g., an angle that lies within the range of (approximately) 135° to (approximately) 225°) and the term "generally orthogonal" should be understood as referring to configurations in with the pertinent components are oriented so as to define an angle therebetween that is equal to 90°±25% (e.g., an angle that lies within the range of (approximately) 67.5° to (approximately) 112.5°). The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicular airbag system comprising:
- a case;
- an airbag housed within the case;
- a regulator in communication with the airbag and configured to inflate the airbag upon detection of a collision; and
- a deployment flap secured to the case and extending about the airbag, the deployment flap defining a length and a width and including:
  - a main body portion including a tear seam extending in generally parallel relation to the width of the deployment flap and configured to separate during inflation of the airbag such that the airbag extends through the deployment flap; and
  - wings extending laterally from the main body portion in generally parallel relation to the width of the deployment flap, wherein the tear seam is located between the wings such that the wings are spaced from the tear seam along the length of the deployment flap,
- wherein inflation of the airbag causes separation of the tear seam such that the deployment flap directs the airbag during inflation and inhibits eccentric deployment from the case.

2. The vehicular airbag system of claim 1, wherein the deployment flap is integral in construction.

3. The vehicular airbag system of claim 2, wherein the main body portion and the wings are formed form a single piece of fabric material.

4. The vehicular airbag system of claim 1, wherein the main body portion includes an aperture configured to receive the regulator such that that regulator extends through the main body portion.

5. The vehicular airbag system of claim 1, wherein the main body portion and the wings each include at least one opening configured to receive a retainer on the case to thereby connect the main body portion and the wings to the case.

6. The vehicular airbag system of claim 1, wherein the tear seam is generally linear in configuration.

7. The vehicular airbag system of claim 1, wherein the tear seam is generally centered in relation to the case along a reference axis extending in generally parallel relation to the length of the deployment flap.

8. The vehicular airbag system of claim 1, wherein the wings include:
- a first wing extending from the main body portion in a first direction;
- a second wing spaced from the first wing along the length of the deployment flap and extending from the main body portion in the first direction;
- a third wing extending from the main body portion in a second direction; and
- a fourth wing spaced from the third wing along the length of the deployment flap and extending from the main body portion in the second direction.

9. The vehicular airbag system of claim 8, wherein the first wing and the third wing are generally aligned along the length of the deployment flap and the second wing and the fourth wing are generally aligned along the length of the deployment flap.

10. The vehicular airbag system of claim 1, wherein the deployment flap further includes:
- expandable portions defined by the main body portion and the wings; and
- restrictors in engagement with the expandable portions and configured to rupture during inflation of the airbag, wherein inflation of the airbag causes expansion of the expandable portions and lengthening of the main body portion and the wings prior to separation of the tear seam.

11. A deployment flap for a vehicular airbag system, the deployment flap comprising:
- a main body portion including a tear seam configured to separate during inflation of an airbag such that the airbag extends through the deployment flap, the main body portion defining a length and a width;
- wings extending laterally from the main body portion along the width of the main body portion, wherein the tear seam is located between the wings such that the wings are spaced from the tear seam along the length of the main body portion; and
- at least one expandable portion reconfigurable from a collapsed configuration into an expanded configuration to thereby facilitate lengthening of the main body portion and the wings prior to separation of the tear seam during multi-stage inflation of the airbag, whereby the deployment flap directs the airbag and inhibits eccentric deployment.

12. The deployment flap of claim 11, wherein the at least one expandable portion includes a folded configuration.

13. The deployment flap of claim 11, wherein the at least one expandable portion includes a rolled configuration.

14. The deployment flap of claim 11, further including at least one restrictor in engagement with the at least one expandable portion, the at least one restrictor being frangible in construction such that the at least one restrictor ruptures during inflation of the airbag.

15. The deployment flap of claim 14, wherein the at least one restrictor is configured as a tack sew laced through the at least one expandable portion.

16. A method of deploying an airbag in a vehicle, the method comprising:

a first stage of deployment including inflating the airbag to displace a deployment flap extending about the airbag, the deployment flap defining a length and a width;

a second stage of deployment including expanding the deployment flap by lengthening a main body portion of the deployment flap; and a third stage of deployment including separating the deployment flap along a tear seam such that the airbag extends through the deployment flap, wherein the tear seam is located between wings extending laterally from the main body portion along the width of the deployment flap such that the wings are spaced from the tear seam along the length of the deployment flap.

17. The method of claim 16, wherein the second stage of deployment includes lengthening the wings.

18. The method of claim 17, wherein lengthening the main body portion of the deployment flap and lengthening the wings includes expanding expandable portions of the deployment flap.

19. The method of claim 18, wherein expanding the expandable portions includes unfolding the expandable portions.

20. The method of claim 18, wherein expanding the expandable portions includes rupturing restrictors engaging the expandable portions.

* * * * *